(No Model.)
G. W. HOLLINGSWORTH.
DEVICE FOR RENEWING VALVES AND VALVE SEATS.
No. 371,321. Patented Oct. 11, 1887.
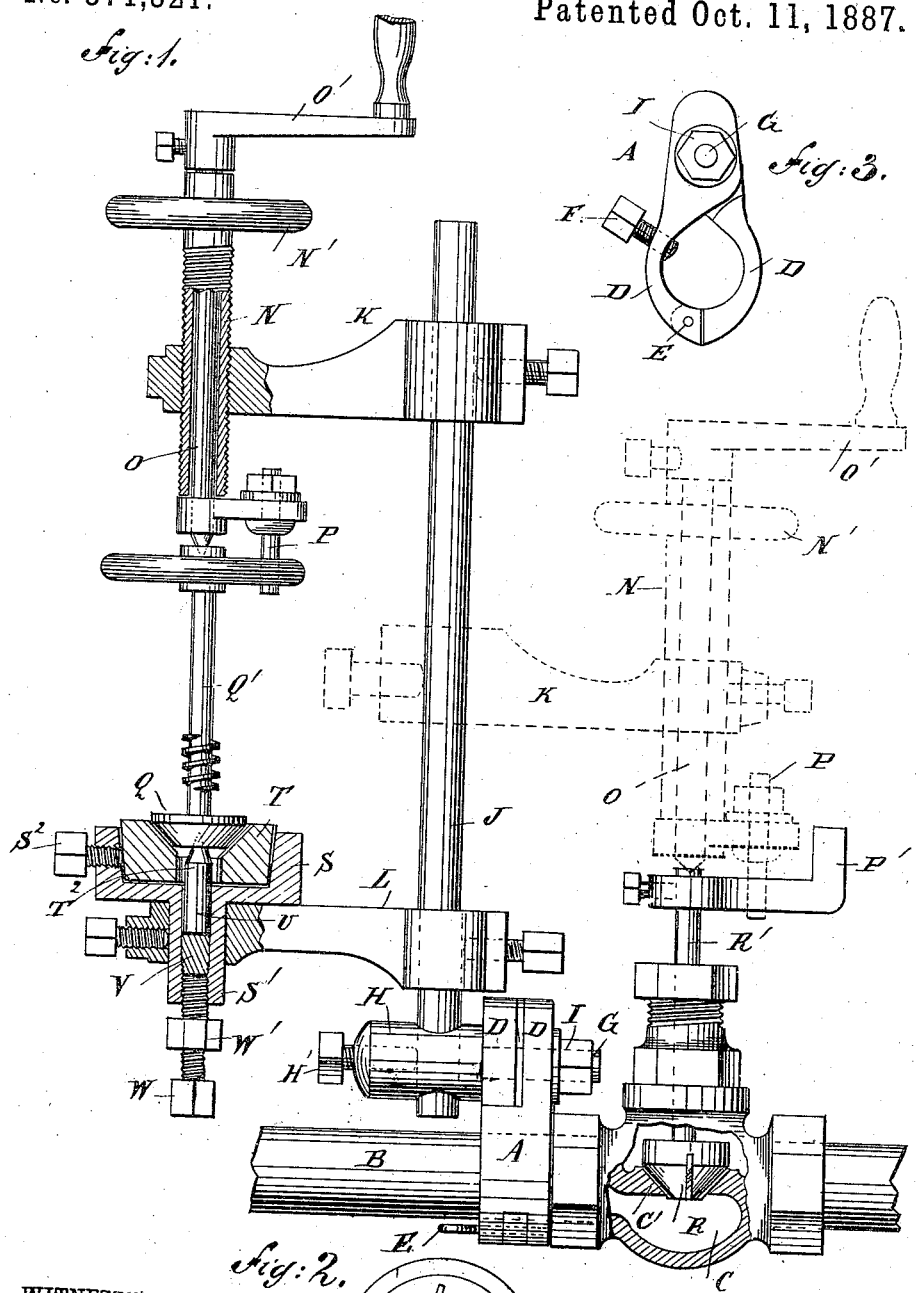
WITNESSES:
Chas. Nida
C. Sedgwick
INVENTOR:
G. W. Hollingsworth
BY Munn & Co.
ATTORNEYS.

UNITED STATES PATENT OFFICE.

GEORGE W. HOLLINGSWORTH, OF PHILADELPHIA, PENNSYLVANIA.

DEVICE FOR RENEWING VALVES AND VALVE-SEATS.

SPECIFICATION forming part of Letters Patent No. 371,321, dated October 11, 1887.

Application filed June 25, 1887. Serial No. 242,480. (No model.)

*To all whom it may concern:*

Be it known that I, GEORGE W. HOLLINGSWORTH, of Philadelphia, in the county of Philadelphia and State of Pennsylvania, have invented a new and Improved Hand-Drill for Renewing Valves and Valve-Seats, of which the following is a full, clear, and exact description.

The object of my invention is to provide a new and improved hand-drill especially adapted for renewing worn-out valves and valve-seats without disconnecting the valve from its pipe and without disturbing the latter.

The invention consists in the construction and arrangement of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of my improvement with parts in section. Fig. 2 is a plan view of the chuck holding the cutter for grinding the valves, and Fig. 3 is a face view of the clamp.

My improved hand drill is supported on a clamp, A, adapted to be fastened to the pipe B, carrying the valve C, the seat C' of which is to be renewed. The clamp A is provided with two jaws, D, which can be opened and placed around the pipe B and then closed and locked by a pin, E, passing through the free overlapping ends of said jaws D. Into one of the latter screws a set-screw, F, which is then screwed up against the pipe B, thus securing the clamp A to said pipe B.

The jaws B are clamped on the bolt G, projecting from the collar H, and said jaws D are fastened on said bolt G by the washer and nut I, screwing on the bolt G and against the clamp A, so that the latter is pressed against the collar H and securely held in place on the bolt G between the said collar H and the washer and the nut I. It will be seen that the clamp A can be fastened on the pipe B and on the bolt G in any desired place and at any desired angle according to the location of the valve C in the pipe B, and according to the place of the latter, so as to enable the operator to use the hand-drill conveniently for renewing the valve, especially when the valve is located in a limited space.

The collar H is adjustable by a set-screw, H', on the upright rod or post J, on which are held to slide the arms K and L, fastened by set-screws or other means to the upright J. In the outer end of the upper arm, K, screws the hollow spindle N, carrying near its upper end a hand-wheel, N', for turning said spindle N in the arm K. Through the spindle N passes the centering-shaft O, provided on its upper end with a crank-arm, O', resting with its hub on the upper end of the hub of the wheel N', thus supporting the shaft O and serving to turn the latter in the spindle N.

On the lower end of the shaft O is held the dog P, of any approved construction, and adapted to engage a spoke of the wheel of the valve-stem Q', as shown at the left of Fig. 1, and said dog P engages a second dog or arm, P', held on the stem R' of the seat proper, R, as shown at the right of Fig. 1.

On the end of the lower arm, L, is fastened, by a set-screw or other means, a socket or holder, S, in which is held by the set-screw $S^2$ the valve-cutter T, provided with the usual cutting-edges T', formed in a central cone-shaped opening, and said valve-cutter T is also provided with a central centering-opening, $T^2$, in its bottom, through which opening passes the upper pointed end of the arbor U, held to slide vertically in a central aperture of the shank S' of the chuck S, and resting with its bottom on the spring V of rubber or other suitable material. The spring V can be raised and lowered in the hollow shank S' by the set-screw W, screwing into the lower shank of the hollow shank S' and held in place by a jam-nut W'.

The operation is as follows: The clamp A is secured to the pipe B, as above described, so that the upright J is parallel with the axis of the valve seat C'. In order to grind or cut the valve Q, secured to the valve-stem Q', I adjust the hand-wheel as shown at the left of Fig. 1—that is, the centering end of the shaft O fits on the top of the stem Q' and the centering end of the arbor U engages the lower end of said valve Q, which is held in the cutter T, which latter, the valve-stem Q', the arbor U, and the shaft O are held axially in relation to each other. The operator now turns the crank-arm O' with one hand, so that the valve-stem Q' is turned by the dog P and the valve Q is cut by the cutting-edges T' of the stationary cutter T. The operator turns the hand-wheel N' with his other hand, whereby the spindle N and the shaft O are fed downward, and the valve Q' is thus pressed firmly in contact with the cutting edges T' of the cutter T, so that the valve is cut. The elasticity of the spring V permits this downward movement of the valve Q, as above described. By adjusting the arbor U up or down in the shank S', I am enabled to cut large or small valves.

The seat C' of the valve C is cut as represented at the right of Fig. 1, and in this case I dispense with the lower arm, L, and place the centering end of the shaft O on top of the stem R' of the seat-cutting tool R, which is placed in the seat C' of said valve C. The dog P on the shaft O engages the dog P' on the stem R', and when the operator turns the crank-arm O' and the hand-wheel N', as above described, then the seat-cutting tool R cuts and renews the seat C' of the valve C. The valve Q can also be ground into the valve-seat C' by substituting the valve Q and its stem Q' for the seat-cutting tool R and its stem R' and repeating the operation, as above described— that is, turning the hand-wheel N' and the crank-arm O'. Thus it will be seen that the valve-seats can be easily and conveniently renewed in their places without disturbing the valve-casing and the pipe on which the valve is secured, and the corresponding valve for the seat is also recut to correspond to the renewed valve seat.

Having thus fully described my invention, I claim as new and desire to secure by Letters Patent—

1. In a device for renewing valves and valve-seats, the combination, with a clamp adapted to be secured to the pipe carrying the valve to be cut, of an upright post supported by said clamp and carrying the drilling mechanism, substantially as shown and described.

2. In a device for renewing valves and valve-seats, the combination, with a clamp comprising the pivoted jaws, of means, substantially as described, for locking said jaws, and a set-screw for fastening said clamp to a pipe carrying the valve to be cut, substantially as shown and described.

3. In a device for renewing valves and valve-seats, the combination, with a clamp having pivoted jaws adapted to inclose the pipe carrying the valve to be cut, of means, substantially as described, for locking said jaws, a set-screw for fastening said clamp to the pipe carrying the valve to be cut, a bolt on which said jaws are fulcrumed, a collar on said bolt, said collar supporting an upright carrying the drilling mechanism, and a washer and nut screwing on said bolt for securing said clamp on said bolt, substantially as shown and described.

4. In a device for renewing valves and valve-seats, the combination, with a clamp and upright, of two arms held adjustably on said upright, a hollow threaded spindle screwing in the upper one of said arms, a shaft held to turn in said hollow spindle, a dog secured to one end of said shaft, and a socket held in the lower one of said arms and carrying the tool for cutting the valve, substantially as described.

5. In a device for renewing valves and valve-seats, the combination, with a clamp and an upright, of an arm held adjustably on said upright, a hollow spindle screwing in said arm, a shaft held to turn in said hollow spindle, a crank-arm secured to the upper end of said shaft, and a dog fastened on the lower end of said shaft and adapted to engage a dog or arm on the seat-cutting tool, which engages the casting on which the seat is to be formed, substantially as described.

6. In a device for renewing valves and valve-seats, the combination, with a clamp and an upright, of an arm held adjustably on said upright, a socket or holder secured on said arm, a valve-cutting tool supported in said chuck or holder and provided with a central aperture leading to the cone-shaped aperture carrying the cutting-edges, an arbor held in said chuck and passing through the central aperture in said valve-cutting tool, a spring on which said arbor rests, and a set-screw for adjusting said spring, substantially as shown and described.

GEORGE W. HOLLINGSWORTH.

Witnesses:
E. B. HOLLINGSWORTH,
JAMES H. ARMSTRONG.